United States Patent [19]

Budden et al.

[11] 4,390,276

[45] Jun. 28, 1983

[54] COLLIMATOR GUNSIGHT

[75] Inventors: Raymond G. Budden, Havant; Fraser Scott, Guildford, both of England

[73] Assignee: Ring Sights Limited, Surrey, England

[21] Appl. No.: 263,068

[22] Filed: May 13, 1981

[30] Foreign Application Priority Data

May 14, 1980 [GB] United Kingdom ............... 8015977

[51] Int. Cl.³ ............................................ G02B 23/10
[52] U.S. Cl. ....................................... 356/251; 33/233
[58] Field of Search ............... 356/247, 251; 354/219, 354/224; 33/233, 241, 247

[56] References Cited

U.S. PATENT DOCUMENTS 3,942,901 3/1976 Ekstrand ........................... 356/251

FOREIGN PATENT DOCUMENTS

| 452644 | 11/1927 | Fed. Rep. of Germany | 356/251 |
| 862934 | 12/1940 | France | 356/251 |
| 6538 | of 1903 | United Kingdom | 356/251 |
| 880690 | 10/1961 | United Kingdom | 354/224 |

Primary Examiner—John K. Corbin
Assistant Examiner—Matthew W. Koren
Attorney, Agent, or Firm—Watson, Cole, Grindle & Watson

[57] ABSTRACT

A collimator gun sight is formed of a solid block of glass with plane parallel opposite end faces. A partially reflecting concave surface in the block forms an image at infinity of a graticule pattern which is illuminated by light entering the block through a window. The block is made from a rod with plane end faces and a lens doublet element cemented to one face.

6 Claims, 6 Drawing Figures

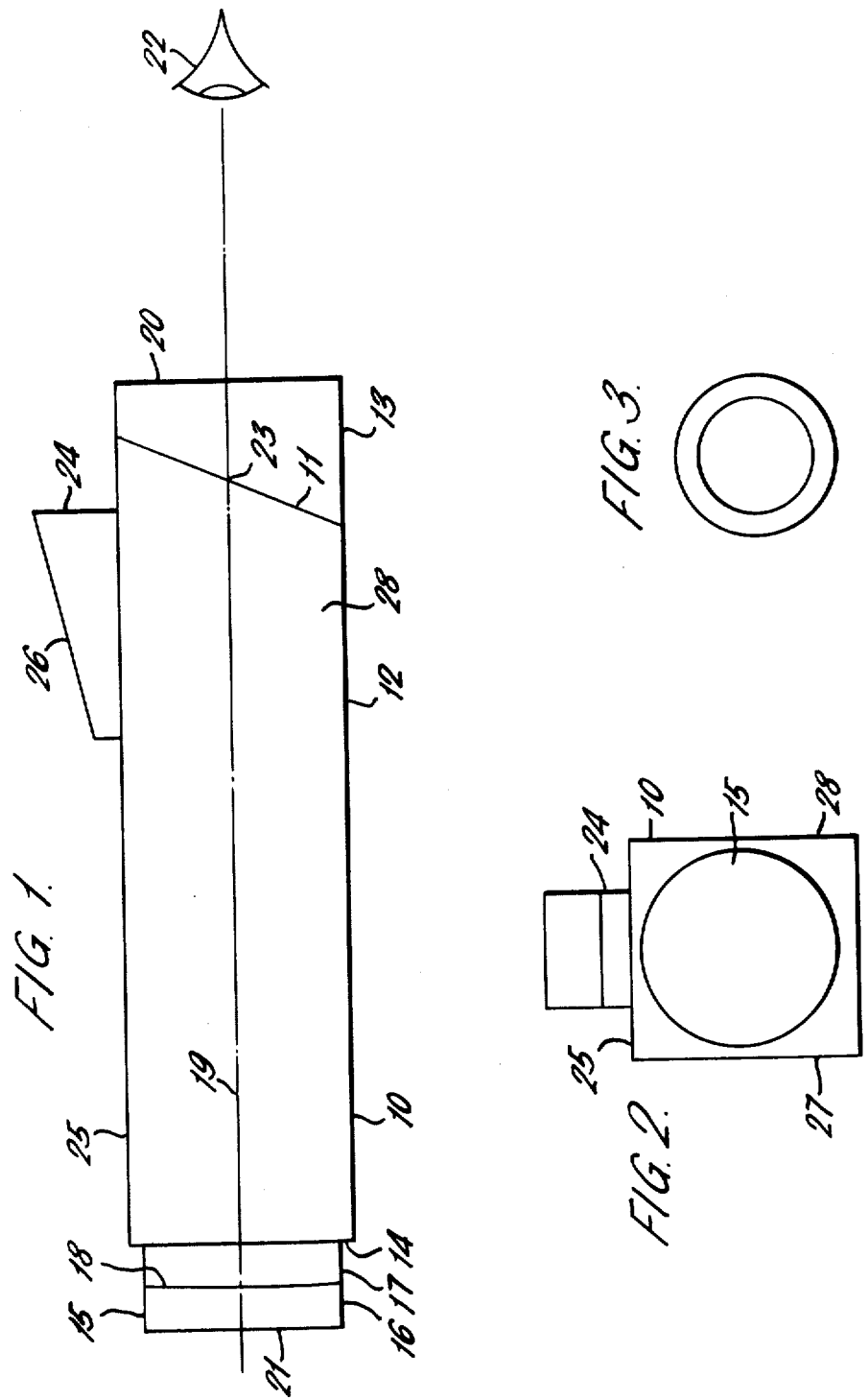

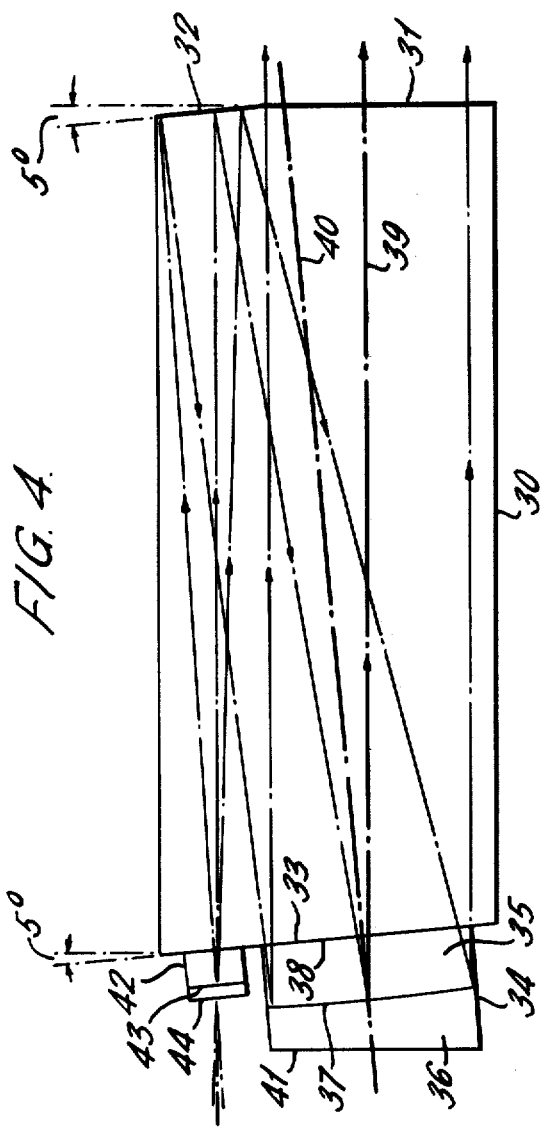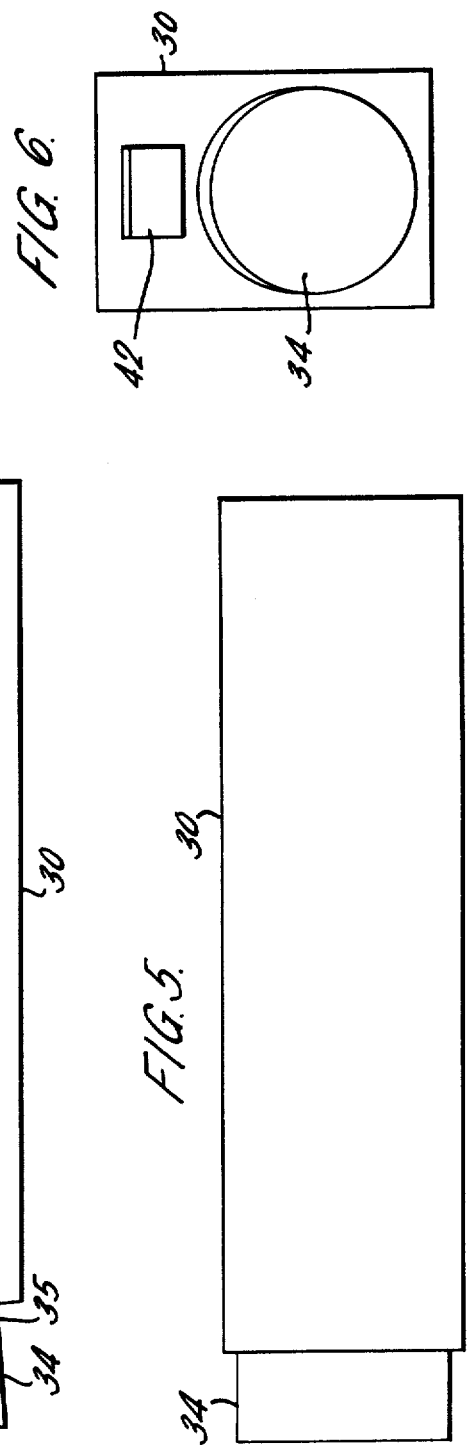

COLLIMATOR GUNSIGHT

BACKGROUND OF THE INVENTION

The present invention relates to collimator gun sights. With such collimator sights, light from a suitably illuminated graticule pattern or other aiming mark is collimated for presentation to an eye of the user of the weapon as an image of the aiming mark at infinity, or at a predetermined distance where appropriate. In one arrangement, the other eye of the user is free to view the target so that, when the brightness levels of the aiming mark and the target are correctly balanced, the user will perceive the aiming point superimposed on the viewed target. It is also known to provide various arrangements for presenting both the collimated light from the image of the aiming point and light from the target to one or both eyes of the user simultaneously. A simple arrangement for doing this which is known is to provide a partially reflecting concave mirror suitably placed to reflect back to the aiming eye of the user of the weapon light from means defining the graticule pattern. If the distance between the concave mirror and the graticule pattern corresponds to the focal length of the concave mirror, the image seen in the concave mirror will appear to be substantially at infinity. The user of the weapon can then view the target field through the partially reflecting mirror whilst simultaneously seeing the image of the graticule pattern at infinity in the mirror. It is usual to ensure that the partially reflecting mirror provides substantially no deflection to light passing through the mirror from the target field so as to minimise any distortion of the target as seen by the user. Thus, it is known to employ a parallel faced meniscus glass for the partially reflecting mirror with one surface of the meniscus glass suitably coated to provide the reflecting surface.

It is also known to form a collimator sight as a block or rod of optically transparent material with the partially reflecting mirror formed at one end of the rod. The means defining the graticule pattern is embedded in the rod so that the light path from the graticule pattern to the partially reflecting surface is entirely within the material of the rod. An example of this type of sight is disclosed in U.S. Pat. No. 3,942,901.

SUMMARY OF THE INVENTION

According to the present invention a collimator gun sight comprises a block of solid transparent material of substantially uniform refractive index formed with an opposed pair of plane parallel outer end faces, whereby a target can be viewed substantially undeviated along a line of sight through the noted pair of faces; the block having, within its body, means defining a partially reflecting transparent concave surface on the line of sight adjacent a distal one of the noted pair of faces, means defining a graticule pattern substantially on the focal plane of the concave surface and window means admitting light from outside the body of the block to illuminate the pattern, the pattern being located so that a virtual image of the pattern, forming an aiming mark, can be seen reflected in the concave surface superimposed on the target viewed along the line of sight.

This arrangement of sight can be manufactured relatively easily and cheaply and with low collimator errors.

In a preferred arrangement, the block comprises an elongate main body portion arranged so that the line of sight extends along the length of the body portion, at least a major portion of one end surface of the main body portion extending in a plane substantially perpendicular to the line of sight to form the proximal one of the pair of faces, at least a major portion of the other end surface of the main body portion extending in a further plane, and a lens doublet forming the concave surface defining means and comprising plano-convex and plano-concave lenses having curved faces cemented together and defining the partially reflecting surface, the plane face of the plano-convex lens being cemented to the other end surface, or the major portion thereof, of the main body portion, and the outer plane face of the plano-concave lens being parallel to the one end surface, or the major portion thereof, of the main body portion, to constitute the distal one of the pair of faces.

With this preferred arrangement, the sight can be manufactured by forming the main body portion of the block with its end surfaces flat, and then cementing on the lens doublet to one end face and finally preparing the outer flat face of the doublet so as to be accurately parallel to the opposite end surface of the main body portion.

In one arrangement, the graticule pattern defining means is located off the line of sight and may preferably be located adjacent the distal plane face of the block, and the block may have plane mirror means to reflect light from the graticule pattern defining means into the concave surface. In this way the effective path length between the graticule pattern defining means and the concave surface can be substantially twice the actual length of the block. As a result, the ratio of aperture to focal length of the concave surface can be kept relatively low before a particular size or length of block, thereby minimising spherical aberrations in the deflected image.

The mirror means may be formed by an outer surface portion of the block adjacent the proximal one of the pair of faces. This outer surface portion is silvered to provide the mirror.

Preferably, the concave surface is symmetrical about its optical axis which is at an angle to the line of sight. Then, the pair of faces may be normal to the line of sight and the normal to the outer surface portion, forming the mirror means, may be parallel to the optical axis of the concave surface. This arrangement provides a compact sight with the optical path from the graticule pattern defining means to the mirror means substantially parallel to the line of sight.

In one embodiment, the block comprises an elongate main body portion arranged so that the line of sight extends parallel to the length of the body portion, a major portion of one end surface of the main body portion being planar and perpendicular to the line of sight to form the proximal one of the pair of faces and a minor portion of the one end surface forming the mirror means, the other end surface of the main body portion extending in a plane parallel to the minor portion of the one end, and a lens doublet forming the concave surface defining means and comprising plano-convex and plano-concave lenses having their curved faces cemented together to define the partially reflecting surface, the plane face of the plano-convex lens being cemented to the other end surface of the main body portion and the outer plane face of the plano-concave lens being parallel to the major portion of the one end surface of the main body portion to constitute the distal one of the pair of faces.

Further, the graticule pattern defining means may be a transmissive graticule and may be cemented to the other end surface of the main body portion.

In a different embodiment of the invention, the concave surface is symmetrical about its optical axis which is parallel to the line of sight and the graticule pattern defining means is located on the optical axis, the pattern being reflecting and sufficiently fine so as not to obscure the virtual image or the target when viewed with an eye sufficiently close to the pattern defining means. It has been found that, if the eye of the user of the gun sight is place sufficiently close to the pattern defining means, this pattern defining means does not obscure the view of the target or of the graticule pattern image even though the defining means is in fact located directly in the line of sight. The gun sight of this embodiment can thus be formed with the concave surface symmetrical about its optical axis but with the graticule pattern defining means located on the optical axis. Of course, the graticule pattern defining means provides a graticule pattern on a transparent field so that only the elements of the graticule pattern itself could potentially obscure the view through the sight. It is much easier and cheaper to form a partially reflecting concave surface which is symmetrical about its optical axis, than an asymmetrical surface such as that used in the arrangement disclosed in the above referred U.S. Patent. Further, by locating the graticule pattern defining means on the optical axis, the problem of the various aberrations in the reflected image of the graticule is much alleviated. Also the aberration problem is reduced compared with the prior art arrangement using an asymmetrical concave surface, because, for the same aperture of partially reflecting surface, the present invention employs only portions of the reflecting surface relatively close to the optical axis. Because aberrations can be reduced with the present invention, the resulting sight can be made shorter for the same errors.

It should be understood that this embodiment of the present invention is designed to be used with the graticule pattern defining means relatively close to the eye. For gun sights, a typical graticule pattern appears when viewed through the gun sight to have a line thickness subtending an angle of 0.001 radians to the eye. When the collimator sight is arranged to present the image of the graticule pattern at infinity, i.e., when the graticule pattern is located substantially at the focal point of the concave partially reflecting surface, then the actual thickness of the lines of the graticule pattern in the pattern defining means should be approximately equal to $f \times 10^{-3}$ where f is the focal length of the concave surface. A typical focal length of a concave surface used in the sight of this embodiment of the present invention is about 20 mm, so that the actual thickness of the lines of the graticule pattern in such a sight should be about 0.02 mm. It will be appreciated that lines of such thickness would be quite unnoticeable, even though lying on the line of sight through the gun sight, when viewed with the eye relatively close to the gun sight so that the distance from the graticule pattern defining means is only a few centimeters.

The graticule pattern is made reflecting so as to reflect light incident upon it back into the aperture of the partially reflecting concave surface. It will be appreciated that, when the sight is mounted in an opaque tube, light from the target field entering the sight through the partially reflecting surface will normally be inadequate to illuminate the graticule pattern sufficiently for it to be seen reflected in the concave surface. Accordingly, normally, the means for illuminating the graticule pattern is located clear of the field of view along the optical axis through the partially reflecting surface and is arranged to direct illuminating light towards the reflecting graticule pattern from off the optical axis. Then, the graticule pattern defining means may comprise a reflecting surface or surfaces acutely angled relative to the optical axis to reflect the illuminating light towards the partially reflecting surface.

The reflecting surface or surfaces of the graticule pattern may lie in a single plane or the surfaces may lie in a set of parallel planes and the means for illuminating may then be arranged to direct illuminating light towards the reflecting surface or surfaces substantially parallel to a plane containing the optical axis and perpendicular to the plane or planes of the surface or surfaces. Then, the graticule pattern can be illuminated from a source of illuminating light located to one side of the line of sight through the gun sight and the reflecting surface or surfaces of the pattern is/are arranged to make optimum use of the illuminating light falling upon it/them by specularly reflecting this light into the aperture of the concave partially reflecting surface.

The block may have adjacent a proximal one of the pair of faces a plane cut across the block at an acute angle to the optical axis, and the reflecting surface or surfaces of the graticule pattern may then be provided in the plance of the cut, the two portions of the block formed by the cut being cemented together. Thus, the graticule pattern defining means may be applied as a silver coating to one of the abutting surfaces of the cut through the block before the two portions are subsequently cemented together so that the graticule pattern defining means is embedded in the body of the block.

The means for illuminating the graticule pattern may then comprise a prism cemented to a side face of the block between the partially reflecting surface and the graticule pattern defining means, the prism being arranged to deflect ambient light from a predetermined sector relative to the optical axis into the block through the side face towards the reflecting graticule pattern so as to be reflected thereby into the partially reflecting concave surface. The predetermined sector may be selected so that, when the sight is used on a suitable weapon, the graticule pattern is illuminated by ambient light from just above target. This is especially convenient so that the illumination level of the graticule pattern is varied automatically with the ambient light level and in particular with the brightness of the target.

Examples of embodiments of the invention will now be described with reference to the accompanying drawings.

BRIEF DESCRIPTION OF THE DRAWINGS

FIG. 1 is a view in elevation from one side of the optical elements of one embodiment of a collimator gun sight according to the present invention;

FIG. 2 is a corresponding view from the left-hand end of the sight of FIG. 1;

FIG. 3 illustrates a typical graticule pattern for the gun sight of FIGS. 1 and 2;

FIG. 4 is a view in elevation from one side of the optical elements of another embodiment of the present invention;

FIG. 5 is an underneath plan view of the embodiment of FIG. 4; and

FIG. 6 is an end view of the embodiment of FIGS. 4 and 5.

DESCRIPTION OF THE PREFERRED EMBODIMENTS

Referring to FIGS. 1 to 3 of the drawings, this embodiment of sight is formed as a solid block of optically transparent material, such as a suitable glass. Although the sight, when assembled as shown in FIG. 1, is a single block, the block is formed of several parts cemented together. Thus, the block comprises an elongate bar 10 of square cross-section as shown in FIG. 2. The bar 10 is itself divided by a plane cut 11 into a first portion 12 and second portion 13. A partially reflecting doublet optical element 15 is cemented centrally to the left hand end face 14 of the bar 10. The doublet element 15 comprises a plano concave lens 16 and a plano convex lens 17 which are cemented together at their curved faces which are substantially spherical and of the same radius. A partially reflecting layer 18 is provided between the two lenses 16 and 17 so as to form a partially reflecting concave mirror surface when viewed from the right hand side of FIG. 1. Various materials may be employed to provide the partially reflecting layer 18. For example, one of the curved surfaces of the lenses 16 and 17 may be coated with for example, silver, aluminium, gold, copper or chrome. The choice of coating material is dependent on the colours required to be preferentially reflected and transmitted.

The partially reflecting concave surface formed by the layer 18 is symmetrical about its optical axis, indicated by the dotted line 19 in FIG. 1, and is arranged so that the optical axis 19 extends substantially centrally along the axis of the bar 10. As shown in FIG. 1, the bar 10 has end faces 14 and 20 which are perpendicular to the axis 19 and the doublet element 15 is formed with its outer plane faces parallel to one another so that, when the element 15 is cemented to the end face 14 of the bar 10, the exposed plane face 21 of the element 15 is perpendicular to the opposite end face 20 of the bar 10. Thus, the entire block with the element 15 at one end is substantially optically neutral when viewed through the length of the sight, for example by an eye 22 located to the right of the sight in FIG. 1.

The partially reflecting surface formed by the layer 18 is arranged to have a radius of curvature which is less than twice the length of the bar 10 so that the focal length in air of the concave surface is less than the length of the bar. In the present example, the plane cut 11 through the bar 10 intersects the optical axis 19 of the concave surface at the focal point 23 of the concave surface. A graticule for the sight is located centred at the focal point 23 in the cut 11 between the portions 12 and 13 of the bar 10. Conveniently, the graticule is formed by applying a silvered layer in the form of the graticule pattern, to the surface of the portion 12 of the bar 10 before the two portions 12 and 13 are cemented together. The graticule pattern is therefore formed of a reflecting surface or surfaces which can reflect light illuminating the graticule from the left of the focal point 23 in FIG. 1, towards the concave surface formed by the layer 18. The reflecting surfaces of the graticule pattern lie in the plane of the cut 11 and the cut 11 is orientated so as to reflect towards the partially reflecting concave surface illuminating light provided from a prism 24 which is cemented to a top surface 25 of the bar 10. Prism 24 has an upper light collecting surface 26 which is angled relative to the surface 25 of the bar 10 so as to deflect ambient light entering the surface 26 from the left in FIG. 1, downwards through the prism 24 and into the bar 10 through the surface 25. As shown in the figure, the plane of the cut 11 is perpendicular to the side faces 27 and 28 of the bar 10 (FIG. 2). Similarly, the face 26 of the prism 24 is perpendicular to the side faces 27 and 28 so that the ambient light deflected by the prism 24 into the bar 10 is directed generally parallel to a plane containing the optical axis 19 and perpendicular to the plane of the cut 11.

The angle of the cut 11 to the optical axis 19, the angle of the face 26 of the prism 24 to the top surface 25 of the bar 10 and the position of the prism 24 along the length of the bar 10 between the focal point 23 and the doublet element 15 are selected so that the illuminating light, reflected by the reflecting surfaces of the graticule pattern substantially parallel to the optical axis 19 towards the partially reflecting concave surface formed by the layer 18, comprises light entering the surface 26 of the prism 24 from a sector which is slightly above the target field viewed through the sight by the eye 22. In this way the brightness of the graticule pattern is automatically adjusted in accordance with the brightness of the target.

In use, the sight is enclosed in an opaque tube with the prism 24 protruding through one side of the tube so that the surface 26 is exposed to ambient light. The tube may form part of a mechanical mounting arrangement for mounting the sight on a gun or other weapon and the mounting arrangement may provide for zeroing of the sight in the usual way. No further details of the mounting arrangement are given herein because it forms no part of the present invention.

When using the sight, the aimer of the weapon places his eye 22 relatively close to the end face 20 of the bar 10. The user then views the target through the length of the block, i.e., the bar 10 and element 15, and can see superimposed on the target field, an image of the graticule pattern reflected in the partially reflecting surface formed by the layer 18.

FIG. 3 illustrates a typical graticule pattern which may be used in the sight of FIGS. 1 and 2 comprising a simple circle. The graticule pattern is formed in the plane of the cut 11 and therefore in order for the image of the pattern reflected in the concave reflecting surface of the layer 18 to appear as a circle, the actual pattern in the plane of the cut 11 should be somewhat elongated in the vertical direction to account for the angle of the cut to the optical axis 19. The pattern is formed as a silvered reflecting surface and the image of the pattern seen by the eye 22 appears as a bright circle superimposed on the target field.

The sight may be made very small and in one example the overall length from the surface 20 to the surface 21 is about 32 mm and the bar 10 has a square cross-section of side 8 mm with the doublet element 15 being circular with a diameter of slightly less than 8 mm. The partially reflecting concave surface formed by the layer 18 has a radius of curvature of 54 mm so that the focal point 23 is 27 mm from the optical centre of the layer 18. The actual graticule pattern at the focal point 23 is extremely fine. For the example of FIG. 3, the circle has an outer diameter of 0.142 mm providing a line thickness of 0.1775 mm. Typically the eye 22 is placed only about 5 cm behind the surface 20 of the sight and at this distance the graticule pattern at the focal point 23 is quite invisible and in no way obscures the view through the sight. However, it is straightforward to calculate that the graticule pattern of FIG. 3 with these dimensions produces reflected in the layer 18, an image at infinity having a diameter which subtends 6 milliradians at the eye 22, which provides an aiming mark of a useful size. It will be appreciated that the size of the image of the aiming mark depends on the refractive index of the material of the block. Preferably, all the transparent components of the sight, i.e., the two portions 12 and 13 of the bar 10, the doublet element 15 and the prism 24 are formed of the same material with the same refractive index. In the dimensioned example above, the refractive index is taken to be about 1.52 in order to produce an aiming mark having an outer diameter of about 6 milliradians.

By forming the sight as a solid block of transparent material as described the effective magnification of the graticule pattern is increased by the factor of the refractive index of the material of the sight. This permits the actual graticule pattern at the focal point 23 to be made that much smaller and finer for the same size of image.

The angle of the cut 11 to the optical axis 19 is not critical. However, the angle should not be so small that the vertical extent of the graticule pattern at the focal point 23 causes it to extend significantly on either side, along the optical axis 19, of the actual focal point. This would result in the upper and lower limits of the image of the graticule pattern viewed by the eye 22 to appear to be out of focus. Provided the graticule pattern has only a very small extent, then the vertical defocusing of the image is negligable and an angle between the cut 11 and the optical axis of about 67.5 degrees has been used sucessfully. The prism 24 is then located and arranged to direct light appropriately to the graticule surface to be reflected into the aperture of the partially reflecting surface. With the prism located as shown in FIG. 1, it has been found convenient to form the surface 26 of the prism at an angle of 15 degrees to the optical axis.

If, however, it is desired to form the graticule pattern with a greater vertical extent, for example in order to provide for greater elevation on the graticule itself, then it may be necessary to increase the angle of the cut 11 to the optical axis so that it is more nearly normal to the axis. In which case, it will be necessary to form the sight with the prism 24 positioned further along the length of the bar 10 towards the doublet element 15 and the angle of the surface 26 should be altered accordingly to ensure that ambient light from the desired sector is deflected towards the graticule pattern at the required angle. It may also be necessary to make the prism rather large to ensure that the required amount of illuminating light reaches the graticule pattern.

Referring to FIGS. 4 to 6, a different embodiment of collimator sight is illustrated, in which the graticule defining means is located off the line of sight through the instrument. Once again, this embodiment of sight when assembled has the form of a single block of transparent material, e.g., glass. However, the sight is conveniently manufactured from several separate pieces of glass which are subsequently cemented together to form the complete block. Thus, the sight comprises a main body portion comprising a rectangular section bar or rod 30. One end surface of the bar has a major portion 31 formed to extend in a plane perpendicular to the length of the bar. An upper minor portion 32 of the surface is in a second plane inclined at a slight angle to the plane of the portion 31. The opposite end face 33 of the bar 30 extends entirely in a further plane which is parallel to the plane of the portion 32.

A lens doublet 34 is cemented to the face 33 of the bar 30. The lens doublet comprises a plano-convex lens 35 and plano-concave lens 36. The curved faces of the two lens elements have the same radius of curvature. One of the curved faces is appropriately coated to provide a partially reflecting surface and the curved surfaces of the two elements are cemented together as illustrated in FIG. 4 so that the doublet defines a concave partially reflecting surface 37 when viewed from the right-hand side in the figure. The partially reflecting concave surface 37 is arranged to be symmetrical about its optical axis 40. Further, the plano-convex lens element 35 of the doublet has a plane face 38 which is normal to the optical axis of the surface 37, so that the optical axis of the reflecting surface, when the doublet is cemented to the end 33 of the bar 30, extends at an angle to the longitudinal axis 39 of the bar 30. The angle between the optical axis 40 and the longitudinal axis 39 is equal to the angle of the end face 33 to the opposite end face 31.

The outer plane face 41 of the plano-concave element 36 of the doublet is arranged to be accurately parallel to the major portion 31 of the farther end surface of the bar 30. The minor portion 32 of the end surface of the bar 30 is silvered to provide a totally internally reflecting surface within the bar 30. A graticule defining element 42 is also cemented to the opposite end surface 33 of the bar 30 at a position immediately above the doublet 34, as illustrated in FIG. 4. The graticule defining element is arranged to provide a transmissive graticule pattern and may typically comprise a printed or scribed pattern at an interface 43 in the element 42. The graticule pattern is illuminated by light entering a front window 44 of the element 42, passing through the transmissive portions of the graticule pattern and into the body of the bar 30. The angle of the reflecting portion 32 to the major portion 31 is arranged, in relation to the dimensions of the block and the location of the element 42 and doublet 34, to reflect specularly the light from the graticule pattern into the aperture of the concave partially reflecting surface 37. Further, the radius of curvature of the surface 37 is chosen, also in relation to the dimensions of the rest of the sight, to form an image of the graticule pattern at infinity when viewed from the right-hand side in FIG. 4 by an eye looking in through the major portion 31.

It can be seen that the resulting sight illustrated in FIGS. 4 to 6 presents an image at infinity of the graticule pattern, thereby forming an aiming mark, superimposed on a target viewed along the longitudinal axis 39 of the bar 30. Because the faces of the major portion 31 and the outer face 41 of the doublet 34 are accurately parallel, light from the target field is not deviated on passing through the sight. Further, by reflecting the light from the graticule element in the mirror surface portion 32, the focal length of the partially reflecting surface 37 can be made approximately twice the overall length of the sight block. As a result, the ratio of aperture to focal length of the surface 37 can be kept to a minimum for a particular length of sight. In this way spherical aberrations can be reduced in the image of the aiming mark.

In manufacturing the sight, it is convenient to cement the doublet 34 to the face 33 of the bar 30 and subsequently work the outer face 41 so as to be accurately parallel to the opposite face 31 of the bar 30.

Typical dimensions of the sight illustrated in FIGS. 4 to 6 are an overall length of about 32 mm and a height of about 11 mm. Then the radius of curvature of the partially reflecting concave surface 37 is about 120 mm providing a focal length in glass of approximately 60 mm so that an image of the graticule pattern is formed at infinity. The surface 32 is preferably at an angle of about 5° to the major portion 31 of the end face of the bar 30 and the opposite end face 33 is at the same angle of 5° so that the faces 32 and 33 are parallel. In this way the light path from the graticule element 42 to the reflecting surface 32 is substantially parallel to the longitudinal axis and line of sight 39 through the sight. Normally the sight is formed with all exterior surfaces black or grey except the proximal surface 31 and the distal surface 41 and of course the window 44.

What is claimed is:

1. A collimator gun sight which comprises a block of solid, transparent material which has a substantially uniform refractive index, the block providing a line of sight therethrough by which a target can be viewed in substantially undeviated form, the block including an elongated main body through which the line of sight passes in its longitudinal dimension, the elongated main body including a first end surface and an opposite, second end surface through which the line of sight passes, the first end surface including a major portion which forms the proximal end of the gunsight and is planar and oriented perpendicularly to the line of sight, and a minor portion which is planar and forms a mirror surface; the second end surface of the elongated main body being planer and oriented in parallel with the minor portion of the first end surface;

a lens doublet through which the line of sight passes, the lens doublet including a plano-convex lens which has a convex surface and an opposite, flat surface, and a plano-concave lens which has a concave surface and an opposite, flat surface; the flat surface of the plano-convex lens being cemented to the second end surface of the elongated main body, the concave surface of the plano-concave lens being cemented to the convex surface of the plano-convex lens to provide a partially reflecting transparent concave surface therebetween which is symmetrical about its optical axis, its optical axis being oriented at an angle to the line of sight through the lens doublet and perpendicular to the plane defined by the minor portion of the first end surface of the elongated main body, the flat surface of the plano-concave lens, which forms the distal end of the gunsight, being oriented in parallel with the major portion of the first end surface of the elongated main body, means defining a graticule pattern, the graticule pattern-defining means being located out of the line of sight through the gun sight, and window means for admitting external light into the elongated main body so as to pass through the graticule pattern-defining means, cause a virtual image of the graticule pattern to be reflected off the mirror surface and into the focal plane of the partially reflecting transparent concave surface to thereby form an aiming mark superimposed on the target being viewed along the line of sight.

2. A collimator gun sight as claimed in claim 1, wherein the graticule pattern-defining means is a transmissive graticule and is cemented to the second end surface of the elongated main body.

3. A collimator gun sight which comprises a block of solid, transparent material which has a substantially uniform reflective index, the block providing a line of sight therethrough by which a target can be viewed in substantially undeviated form, the block including a body through which the line of sight passes, the body including a first planar end surface which forms the proximal end of the gun sight, an opposite, second planar end surface which forms the distal end of the gun sight, and a side surface, the first and second end surfaces being parallel to one another, means within the body near the second planar end surface thereof defining a partially reflecting transparent concave surface being symmetrical about its optical axis which is aligned in parallel with the line of sight, one or more flat reflecting surfaces located within the body in one or more parallel planes which are oriented at an acute angle to the optical axis of the partially reflecting transparent concave surface and provide a graticule pattern, a virtual image of which can be provided in the partially reflecting transparent concave surface by reflected light, the graticule pattern forming an aiming mark superimposed on the target being viewed along the line of sight, the graticule pattern defined by the reflecting surfaces to be sufficiently fine that the virtual image thereof and the target can be seen therethrough, and prism means cemented to the side of the body at a point between the reflecting surface(s) and the partially reflecting transparent concave surface in the body, the prism means deflecting ambient light from a predetermined sector external of the gun sight into the body and towards the reflecting surface(s) so as to be reflected thereby and into the partially reflecting transparent concave surface and provide a virtual image of the graticule pattern thereon.

4. A collimator gun sight as claimed in claim 3 wherein the body is comprised of at least two portions which are cemented together, each pair of portions cemented together providing one of the flat reflecting surfaces in the body.

5. A collimator gun sight as claimed in claim 4 wherein the prism means is constructed such that the predetermined sector is located just above the target in the line of sight of the gun sight.

6. A collimator gun sight as claimed in claim 3 wherein the body includes an elongated main body portion through which the line of sight passes in its longitudinal dimension, the elongated main body portion including a first planar end face which forms the proximal end of the gun sight and an opposite second planar end face, and a lens doublet through which the line of sight passes, the lens doublet including a plano-convex lens which has a convex surface and an opposite, flat surface, and a plano-concave lens which has a concave surface and an opposite, flat surface; the flat surface of the plano-convex lens being cemented to the second end face of the elongated main body portion, the concave surface of the plano-concave lens being cemented to the convex surface of the plano-convex lens to provide the partially reflecting transparent concave surface, and the flat surface of the plano-concave lens being oriented in parallel with the first end face of the elongated main body portion and forming the distal end of the gunsight.

* * * * *